United States Patent [19]

Munson et al.

[11] Patent Number: 5,035,625

[45] Date of Patent: Jul. 30, 1991

[54] COMPUTER GAME TEACHING METHOD AND SYSTEM

[75] Inventors: Gerald L. Munson, Madison; Edward P. Daniels, Jr.; Joseph D. Mallozzi, both of Trumbull, all of Conn.

[73] Assignee: Munson Electronics, Inc., New Haven, Conn.

[21] Appl. No.: 384,488

[22] Filed: Jul. 24, 1989

[51] Int. Cl.⁵ .................................... G09B 3/00
[52] U.S. Cl. ........................ 434/332; 434/327; 434/335; 434/362; 273/85 G
[58] Field of Search .............. 434/322, 327, 335, 307, 434/308, 309, 353, 362, 323, 332; 273/85 G, 138 A, 138 R, 1 E, 1 GC, DIG. 28, 123 A; 364/419, 717

[56] References Cited

U.S. PATENT DOCUMENTS

| | | |
|---|---|---|
| 3,245,157 | 4/1966 | Laviana . |
| 3,300,875 | 1/1967 | Nisbet ............................ 434/325 |
| 3,668,312 | 6/1972 | Yamamoto et al. . |
| 4,052,798 | 10/1977 | Tomita et al. . |
| 4,060,915 | 12/1977 | Conway . |
| 4,270,849 | 1/1988 | Tayama . |
| 4,451,701 | 5/1984 | Bendig . |
| 4,539,435 | 9/1985 | Eckmann . |
| 4,580,782 | 4/1986 | Ochi . |
| 4,611,996 | 9/1986 | Stoner ........................... 434/327 X |
| 4,682,957 | 8/1987 | Young . |

Primary Examiner—Robert Bahr
Assistant Examiner—J. L. Doyle
Attorney, Agent, or Firm—DeLio & Associates

[57] ABSTRACT

A method of teaching a student and using a computer game teaching system, a computer game and educational information contained in one or more tutorial modules. A plurality of questions contained in the tutorial module are presented to the student at pause points in the game, the scoring algorithm for the game is modified as a result of positive responses to the questions to permit higher probability of scoring in the game. The student's responses to the questions are stored in a scores database which is transmitted for analysis, at a central location which analyzes the responses from many students and prepares a report for transmittal to a parent or teacher to guide the student's further education.

24 Claims, 2 Drawing Sheets

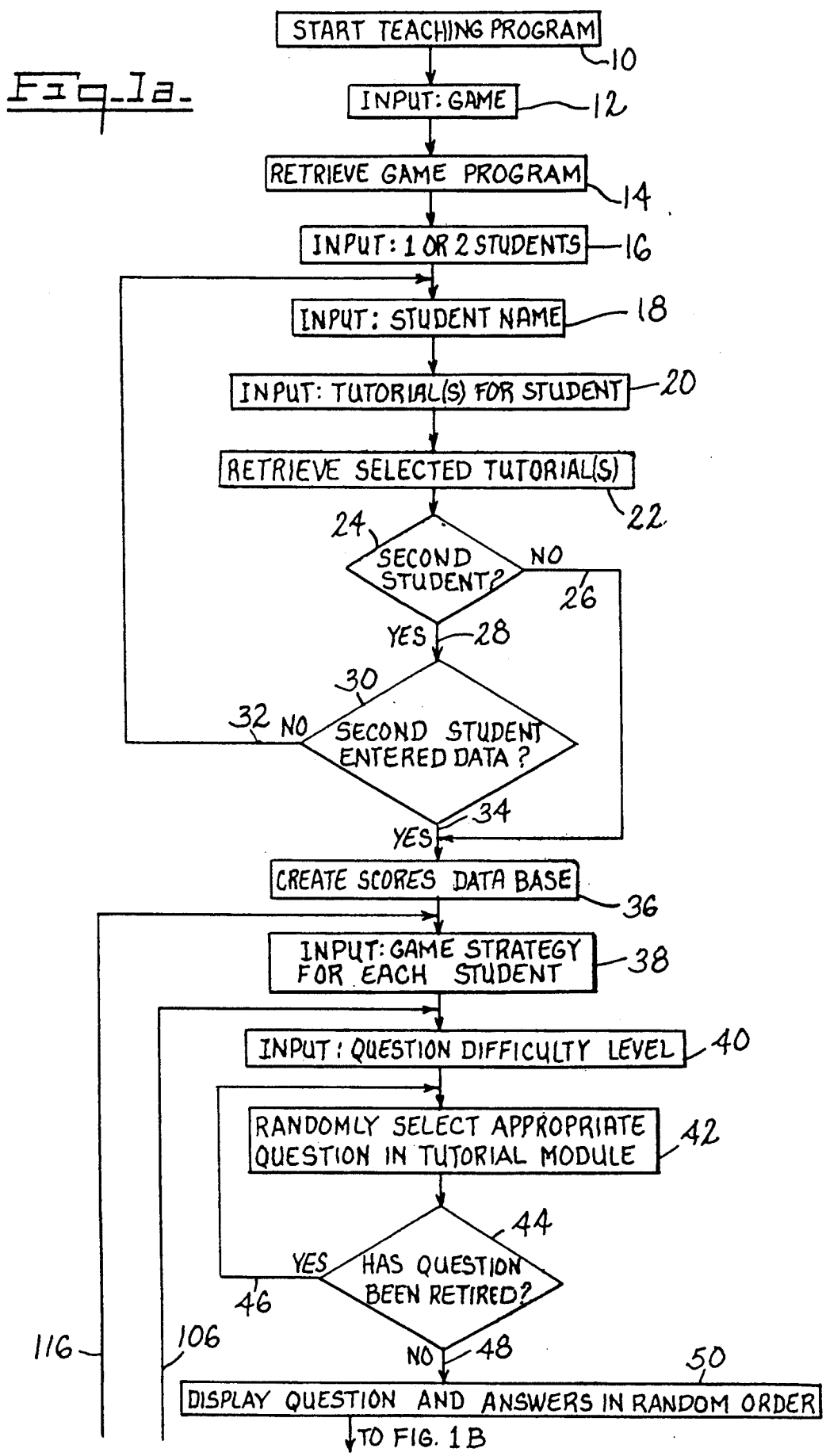

COMPUTER GAME TEACHING METHOD AND SYSTEM

BACKGROUND OF THE INVENTION

1. Field of the Invention

This invention relates to a computer game teaching method and system in which educational information is presented to a student while the student is playing a computer game. More specifically, the invention relates to a method of teaching in which the student's responses to questions relating to the educational information are used both to modify the game scoring and play to provide immediate feedback to the student, and are transmitted for subsequent analysis to guide the student's further education.

2. Description of Related Art

Computer games, and particularly video games are a well-known means of entertainment for both children and adults. Although such games develop and improve hand-eye coordination, they are popular primarily for their entertainment value.

Computer games are available in a wide variety of formats. Some of the more popular formats are: sports games based on sporting contests such as football, baseball, etc.; adventure games which require the player to solve a series of puzzles to progress through the adventure; and arcade games which require the player to shoot opponents and/or avoid being shot. While such games may be quite different in play, they typically have at least one common feature, namely, a game score which is displayed during the game to let the player know how well he is doing.

The same capabilities of the computer which make it an excellent game platform, also make it an excellent teaching tool. The ability to quickly store and manipulate large quantities of information, and to provide different output based on an analysis of that information, gives the computer great potential in the educational field.

Nonetheless, previous attempts at using computers for educational purposes have generally involved teaching programs which, despite being well-designed educationally, are quite dry and scholarly. They are simply not considered to be "fun" like a computer game.

Moreover, such teaching programs have typically been designed only to display the results of one execution of the teaching program and/or to teach only one educational subject. Thus, there is no opportunity for monitoring the students progress over a period of time, for monitoring the student's progress relative to other students using the same program, for providing feedback to the author of the teaching program, or for teaching multiple educational subjects.

Accordingly, one object of the present invention is to combine the "fun" aspects of computer and video games with the educational instruction capabilities of teaching programs. A second object of the invention is to modify the scoring algorithm of the computer game such that as the student demonstrates mastery of the educational information, he can achieve a higher score in the game.

Another object of the invention is to provide a means for teaching any one or more of a variety of different educational subjects by providing multiple compatible tutorial modules which may be selected for use with one or more compatible computer games.

A further object of the invention is to provide a means for centrally analyzing the student's response data so that one student's responses may be analyzed in light of other students' responses.

Other objects and advantages of the present invention will be readily apparent to one skilled in the art.

SUMMARY OF THE INVENTION

This invention comprises both a method of teaching and a computer game teaching system. The teaching method teaches a student by providing the computer game teaching system implemented as a computer teaching program, one or more game programs having game flow pause points and one or more tutorial modules. Each tutorial module contains educational information and a plurality of questions pertaining to the educational information. In the preferred embodiment, any one of the games may be used with any one or more of the tutorials.

The teaching program and game program may be incorporated into a single combined program, or they may be separate, with the teaching program including some means for permitting the selection of one game program to be played from among a set of available game programs. While each game program may be distinctly different from every other game, each game is designed to produce a game score according to a scoring algorithm as a result of game input from the student. Such input preferably involves the use of a joystick to control a game character during game play.

In addition to the game score, each game program is similar to every other game program designed for use with this invention in that each game program is executed in discrete cycles, starting and stopping at a game flow pause point between each cycle. By way of example, the pause point may occur before every play in a football game, before every serve in a tennis game, after every time a point is scored in an arcade game, after every puzzle is solved in an adventure/exploration game, etc.

At each pause point, the teaching program selects a question from a selected tutorial module, and displays the selected question to the student. The student's responses are then stored in a scores database suitable for transmission for analysis, and the scoring algorithm is modified to permit higher scores by the student in the game as a result of positive responses by the student to the questions. The game score is presented to the student during the game to encourage further positive responses.

The method of teaching the student also comprises the steps of receiving the transmitted student response data which was recorded in the scores database, analyzing the response data and preparing and transmitting a report based upon the response data to an authorized recipient to guide the student's further education.

BRIEF DESCRIPTION OF THE DRAWINGS

FIGS. 1a and 1b show a flow diagram containing the principle steps in a teaching program according to the present invention.

DETAILED DESCRIPTION OF THE PREFERRED EMBODIMENT

Figure 1B:
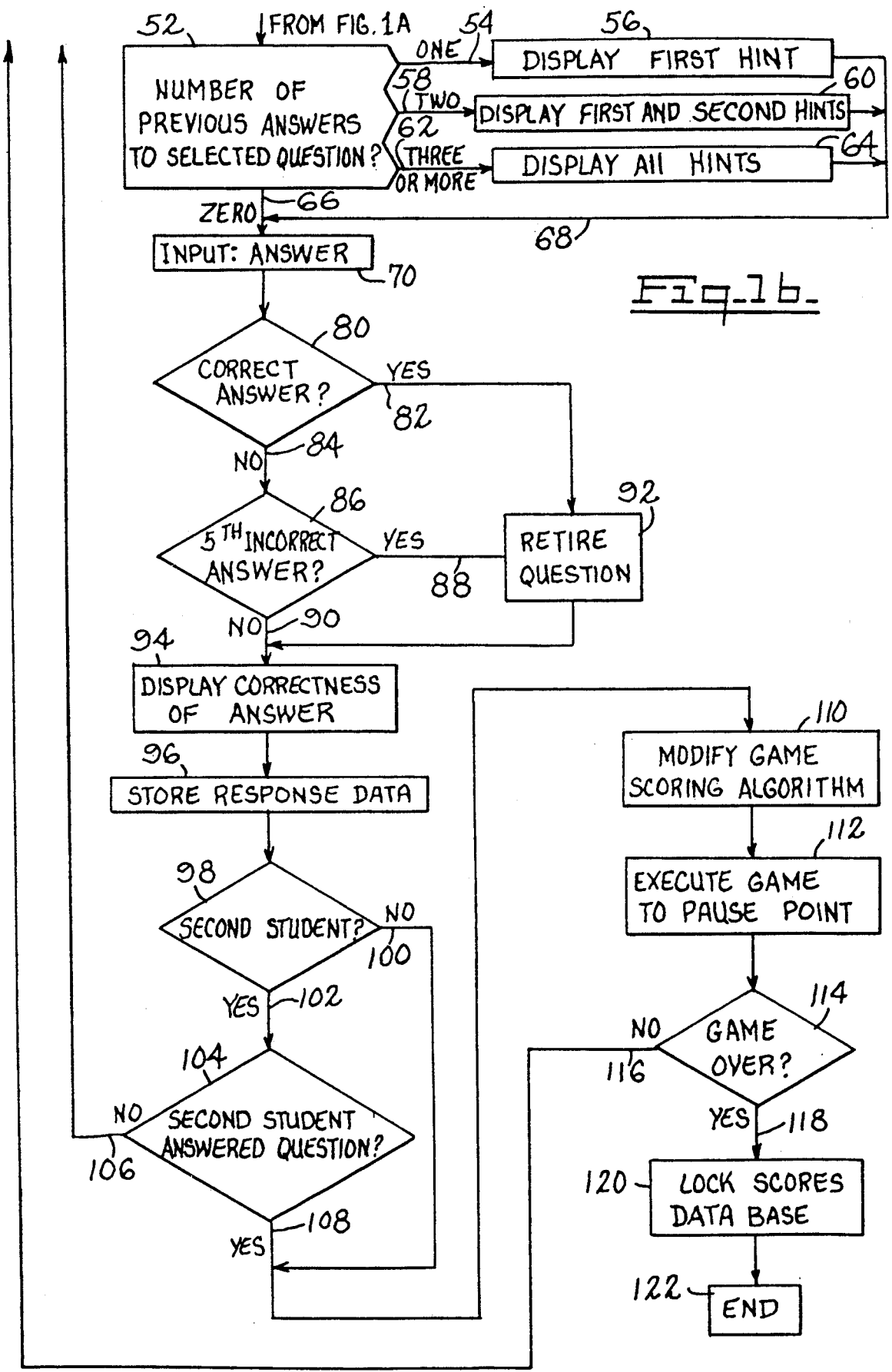

The present invention comprises a teaching method which uses a teaching program according to the flow diagram seen in FIGS. 1a and 1b. The teaching method comprises providing at least one game program and at least one tutorial module to the student. Preferably, a plurality of game programs are provided, such that the student may select a desired game. Games of substantially any type may be provided in accordance with this invention, including sports games, adventure games and arcade games. For the purpose of this description, a football sports game will be used to illustrate the preferred embodiment of the invention.

The method also comprises providing at least one, and preferably a plurality of tutorial modules to the student. Each tutorial module is provided in a standardized format such that any one of the tutorial modules may be selected for use with any one of the game programs. A tutorial module contains educational information and a plurality of questions pertaining to the educational information. The educational information, for example, may pertain to a specific grade level and educational subject, such as, fifth grade mathematics, seventh grade history, etc.

In the preferred embodiment, each tutorial comprises N records. Each record includes one question, four multiple choice answers for the question, and three hints designed to help the student select the best available multiple choice answer, i.e., the "correct" answer. In the most highly preferred embodiment, the three hints progressively become more specific. The first hint is quite general, the second more specific, and the third is very specific, such that the typical student would recognize the best answer after seeing all three hints.

Although only one of the multiple choice answers for each question is considered to be the correct answer or "best" answer, in the preferred embodiment the remaining answers are not all equally wrong. Instead, one of the remaining answers in each set of four is preferably designed to be almost as good as the best answer, i.e., it is the second best answer. Another answer is the third best answer, and one is the worst answer. This sequential ranking permits analysis of the student's answers to identify not only whether the answer was "right" or "wrong", but also allows a quantification of how far the student's response was from the best answer.

The N records in each tutorial module are preferably organized into three groups such that the first N/3 records in the tutorial module include easy questions with their corresponding hints and answers. The next N/3 questions are of a medium difficulty, and the last N/3 questions are hard questions.

The educational information in each tutorial module may be built into the hints, or into the text questions, or into both. In the preferred embodiment, the educational information is primarily in the hints. If the student answers a question with the best answer, the hints are not presented. However, if he incorrectly answers the question, the hints are progressively displayed to teach and guide him to the best answer.

It should also be recognized that although each record in the tutorial module contains a "question", a question is considered to be any request for input from the student, and need not necessarily refer to an interrogative sentence ending with a question mark.

Due to the range of question difficulty levels (easy, medium and hard), the range of answer "correctness" (worst, third best, second best and best), and the three hint levels, (general, specific, very specific), any response by the student may be located very accurately within a broad spectrum of responses. The best possible response would be the selection of the best answer to a hard question without any hints. The worst response would be the selection of the worst answer to an easy question after all three hints were displayed to the student. By designing the hints, answers and questions in this manner the student responses can be placed on a scale and the more positive responses identified. This information is used once to adjust the scoring algorithm in the game to reward positive responses and again in the subsequent analysis of the student's responses to quantify the student's learning and progress.

Regardless of which game and tutorial programs were selected, the teaching program records the student response data in a scores database which is also of a standardized format. The scores database also includes N records corresponding directly to the N questions in the tutorial module. Additional information containing an identification of the specific tutorial number, and the student's name are also included in the scores database to permit subsequent analysis.

Each of the N records in a scores database is comprised of seven fields. The first field indicates whether the question has been retired. The second field records how many times the question has been previously asked, and fields 3–7 contain the sequence of answers selected by the student for this question. For example, if the student first responds to question 6 in the selected tutorial with the worst answer, i.e., answer 4 in the tutorial module, then a "4" would be recorded in field 3 of record 6 in the scores database for this tutorial module. If question 6 is asked again and the student responds with the best answer, i.e., answer 1 then a "1" would be recorded in field 4 of record 6 in the scores database.

During game play, the scores database is used to determine whether a question should be asked, and, if so, whether one or more hints should be displayed.

A question is initially asked without any hints displayed. If the question is then answered incorrectly, field 3 of the record corresponding to the question asked will be filled in with the answer selected by the student. The next time this question is selected by the teaching program for display to the student, field 2 of the record corresponding to this question in the scores database will be checked and it will be determined that the question has been asked one time previously, and that the answer given was incorrect. Accordingly, upon the second display of the question, one hint will be displayed in addition to the question.

In the preferred embodiment, the hints are cumulative. The first hint will be displayed the second time the question is asked. Both the first and second hints will be displayed the third time the question is asked, and all three hints will be displayed the fourth time the question is asked. After the question is answered correctly, the question will be retired by marking the first field in the scores database and the question will not be asked again. If the question is answered incorrectly a total of 5 times, then the question is also retired.

The scores database is recorded in a form which is suitable for transmission for subsequent analysis, typically at a central location. The transmission preferably occurs by recording the scores database on a diskette which may be mailed to the central location for analysis. However, other means of transmission such as transmission over the phone lines via a modem, or by recording the scores data base in a nonvolatile memory cartridge may also be used.

The teaching method continues by receiving the transmitted response data contained in the scores database, analyzing the response data, preparing a report based upon the response data, and transmitting the report to an authorized recipient to guide the student's further education.

The step of analyzing the student response data is preferably performed at a central location where a large number of student response scores databases may be analyzed. Because the scores database includes each response by the student to the question, and, further, because the questions are not merely right or wrong, but are preferably set in a range of correctness from a worst answer to a best answer, the analysis may accurately identify not only the student's mastery of the educational information, but also many other factors of interest. For example, the student's progress may be compared to the progress of other students at the same or similar grade levels. Thus, the central location can build a baseline for measuring an individual student's responses against other students' responses.

Another method of analysis comprises computing a tutorial score for each student based on their responses and sorting the scores from a plurality of students. The students having the lowest scores may be attempting to use tutorial modules which are beyond their capabilities. Conversely, students having extremely high scores may be using a tutorial module which is too simple for their educational level.

A further method of analyzing the student response data is to identify specific questions in tutorial modules which are consistently answered incorrectly. This may be due to poor phrasing of the question, and such questions may be flagged for further review and improvement by the author of the tutorial module.

The report based upon the analysis of the student response data may include recommendations for the student's continuing education by identifying areas in which the student is weak and needs further work, and areas in which the student has demonstrated mastery of the subject appropriate to the student's educational level. Recommendations for further tutorial modules which will assist the student in correcting any deficiencies in his education or help him move to the next educational level may also be incorporated.

In order to implement the present method, the student must obtain or be provided with an appropriate computer. Computers which are suitable include computers manufactured and sold under the tradename Commodore, computers sold by IBM, such as the IBM PC and AT, and computers which are compatible therewith. As those with skill in the art will recognize, appropriate game programs and tutorial modules may be created for substantially any computer having the necessary input and output devices.

The student must then obtain or be provided with the teaching program, a game program and tutorial module according to the present invention.

Although FIG. 1 and the description below describe separate teaching programs and game programs, it should be recognized that the game program may be incorporated into the teaching program such that the student selects the game by purchasing a combined teaching/game program and a separate game selection step is not required.

Referring to FIG. 1a, the student starts the teaching program in block 10, which immediately requests input in block 12. The first input requested is the name of the game to be played by the student.

In the flow diagram of FIGS. 1a and 1b, each block which corresponds to a request for input from the student, begins with "INPUT:". Such an input request involves displaying the request for the student to enter the requested information on the computer screen.

In the preferred embodiment, all input to the teaching program and the game may be entered by a joystick and thus, each input request displays the choices available and highlights the selected choice. The highlighting may be moved via the joystick to the appropriate selection, and a trigger button on the joystick is pressed to choose the highlighted selection.

Once the student selects the game to be played, the teaching program retrieves the game program, at block 14, from its storage location on a computer disk. Next, at block 16, the computer requests the student to state whether one or two students will be playing the game.

In the preferred embodiment, each game may be played either by one student or by two students. When played by a single student, the computer will play the part of the second student. At block 18, the student is requested to enter his name. At block 20, the student selects one or more tutorials which shall be applicable for this game.

The tutorials will generally be provided on one or more computer disks, and will be displayed for selection by the student using the joystick in the manner described above. After selection of the tutorials by the student, the teaching program retrieves the tutorials from the disk at block 20. At block 24, the teaching program branches based upon whether one or two students are playing the game. If there is no second student, then branch 26 is taken and the scores database is immediately created at block 36.

If there is a second student playing, then branch 28 is taken. Block 30 determines whether the second student has entered his name and tutorial information yet. If the second student has not entered this information, then branch 32 is taken and blocks 18–30 are executed again in order to obtain the second student's name and the tutorial(s) to be used by him. Upon the execution of block 30, the second student will have entered this data and branch 34 will be taken arriving again at block 36 in which the scores databases are created for each student. In the preferred embodiment, one scores database is created for each tutorial module selected and for each student.

When a student plays a game solo he is preferably asked to select two tutorial modules for use with the game, so that the game play time will be similar to the game play time with two students each using a single tutorial module. With one student selecting two tutorials or two students, each selecting one tutorial module, a total of two scores databases will be recorded, one for each tutorial module. Each scores database will contain the tutorial identification code with the student's name and/or other identifying information, such that during analysis of the scores database, the corresponding tutorial and student may be identified.

In block 38, the game begins, and each student is requested to enter his game strategy. For the purpose of illustration, it will be assumed that the students have selected a football game program. In block 38, following the football game introduction, both students will be requested to choose the play they want to execute. The offensive player will select between a running play or a passing play, and will then select the particular type of running play or passing play which he desires.

The defensive player will select a defensive play. However, to simulate actual play, the defensive player must make his selection prior to the offensive player's selection, otherwise he will be locked into the default defensive play. After each student has entered his game strategy in block 38, the first student is asked in block 40 what difficulty level he wishes to select for his first question.

In block 42, the teaching program randomly selects an appropriate question of the selected difficulty level in the selected tutorial module. If more than one tutorial module has been selected for use by this student, the teaching program selects an appropriate question corresponding to the difficulty level selected in block 40 from either of the selected tutorial modules.

During game play, various questions will be retired as they are either answered correctly or after the question has been answered incorrectly a set number of times. In the preferred embodiment, five incorrect answers causes the question to be retired. Accordingly, in block 44, after the question has been selected, field 1 in the scores database is checked to determine whether the question has been retired. If the selected question has been retired, branch 46 is taken such that a new question is selected. If the question has not been retired, then the question is appropriate, and branch 48 is taken to block 50.

The selected question is then displayed, and the multiple choice answers are displayed on the screen in random order. By randomizing the order of the answers, the student is prevented from determining the correct answer merely by the position of the answer on the screen. Referring now to FIG. 1b, in block 52 the teaching program refers to the scores database, checks field 2 of the record corresponding to the selected question, and determines the number of times that the selected question has previously been answered by the student.

The first time a question is asked, the scores database will indicate that the question has been answered 0 times previously and accordingly branch 66 will be taken out of block 52. Consequently, the student will be asked to select his answer in block 70, and no hints will be provided. However, if the question has been asked once previously, then the question has been answered incorrectly once (because if the first answer was correct, the question would have been retired) and the first hint will be displayed in block 56.

If the question has been answered twice previously, then branch 58 will be taken out of block 52, and both the first and second hints will be displayed in block 60. Three or more previous incorrect answers will result in branch 62 being taken, and all hints will be displayed simultaneously on the screen in block 64.

The hints are displayed on the screen with the question and the multiple choice answers. In block 70, while the question, available answers and hints (if any) are displayed, the student is asked to select his answer. In the preferred embodiment the selection method once again comprises highlighting the desired multiple choice answer by moving the joystick, and then choosing the highlighted choice by pressing a button.

In decision block 80, the teaching program determines whether the correct answer has been selected. Although in the preferred embodiment, the answers range from a worst answer to a third best answer, a second best answer and a best or correct answer, only selection of the best answer causes the question to be retired in block 92 via branch 82. The selection of anything other than the best answer causes branch 84 to be taken to block 86 where the scores database is checked to determine whether this is the fifth incorrect answer. If the question has been answered incorrectly 5 times, then branch 88 is taken and the question is retired permanently. If this is not the fifth incorrect answer, then branch 90 is taken to block 94 where the teaching program advises the student whether he chose the best answer.

In block 96, the student's response to the question is stored in the scores database. As described above, each of the student's first five responses to each question are stored in fields 3-7 in the scores database for subsequent analysis. At this point, field 2 containing the number of times the question has been asked is also updated for the selected question.

Blocks 98 and 104 operate in the same manner as blocks 24 and 30 to determine whether a second student is playing the game, and whether the second student has answered his corresponding question. If the game is being played by only a single student, branch 100 is taken directly to block 110. On the other hand, if a second student is playing the game, then branch 102 is taken and block 104 determines whether the second student has answered his question. If not, then branch 106 is taken to a point just above block 40 where the second student is asked to select his difficulty level, and an appropriate question is asked.

If two students are playing the game, then after the second student has answered his question, branch 108 will be taken out of block 104 into block 110 wherein the scoring algorithm for the game will be modified pursuant to the responses by the students to their respective questions. The game scoring algorithm is modified to permit a better score or higher score in response to positive or correct input from the student to the tutorial questions.

The exact manner in which the game scoring algorithm is modified depends upon the type of game implemented. In the football game example, in a passing play, the probability of completing the pass is increased above a base value for the selection of the best answer. For the selection of the worst answer, the probability of completion is decreased. The probability is modified proportionally for a second or third best answer.

For running plays, the offensive players running speed is increased by sampling the joystick more often, or by increasing the distance moved between each sample in order to provide more maneuverability and greater speed for the player on the screen during game play. Selection of the worst answer causes the opposite to occur, namely the player being controlled on the screen is slowed.

For the defensive player, correct answers cause the defensive players to move more rapidly and/or increase the likelihood of an interception, etc.

In the preferred embodiment, only the relative correctness of the selected answer is considered in modifying the game scoring algorithm. Selecting the best answer after three or four previous incorrect answers provides the same improvement in percentages and player's performance as selecting the best answer on the first attempt, because the student who has previously answered the question three or four times incorrectly has already been penalized on three or four previous plays.

Once the game scoring algorithm has been modified, the game program is executed to the next pause point in block 112. In a football game, as the game is executed in block 112, each student controls his respective football players on the screen by manipulating them with the joystick. The offensive player/student attempts to move his ball carrier or receiver down field as far as possible, while the defensive player/student attempts to intercept or tackle the ball carrier.

In a typical game, the student's score will be displayed on the screen at least at each pause point.

It should be recognized that the game score which is displayed to the student is separate and distinct from the student response data which comprises the results of the student's responses to the questions and is used in the analysis step. The game score is generally the result of both the student's skill and the student's responses. Thus, a student can to some extent compensate for poor responses to the questions by skill in the game, and vice versa. Nonetheless, to obtain the best game scores, the student must both be skillful in playing the game, and demonstrate mastery over the educational material in the tutorial module. The game score is used primarily to motivate the student to improve his score. On the other hand, the analysis of the student's responses makes no reference to the game score, and skill in playing the game is not a factor in this analysis.

In decision block 114, it is determined whether the game is over. If not, branch 116 is taken back to the point above block 88, and the cycle begins anew with each student being asked to input his respective game strategy. If the game is over, however, branch 118 is taken, the scores database is locked in block 120 and the teaching program ends at block 122.

The student may play the game repeatedly, each time producing a subsequent scores database suitable for transmission for analysis. The scores database is preferably recorded on a computer diskette which is mailed or otherwise transmitted to a central location for analysis. The raw student response data may be analyzed to determine the student's respective placing among other students at his educational level. It may also be analyzed to compare the student's present responses to previous responses to determine the student's progress and rate of learning or to determine the subject area in which the student shows weakness.

Based upon the analysis of the student response data, a report is prepared and transmitted to a parent, teacher or other authorized recipient to guide the student's further education.

The responses may also be analyzed to determine weaknesses in the tutorial modules, i.e., to detect a poorly worded question, hints and answers, and to identify the tutorial module authors who have prepared particularly effective tutorial modules.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

We claim:

1. A method of teaching a student comprising:
   executing a game program by a computer until a game flow pause point is reached and generating a game score according to a game scoring algorithm as a result of game input by the student from an input means;
   selecting a question from a tutorial module containing educational information and a plurality of questions and answers pertaining thereto;
   displaying the selected question to the student on a display means;
   accepting a student response to the displayed question from the input means;
   storing the student response in a scores database of student response data;
   modifying the game scoring algorithm as a result of correct student responses such that better game scores will more likely be generated in response to game input by the student, said game input not being in response to said questions; and
   displaying the game score to the student to encourage the student.

2. The method of claim 1, further comprising the steps of:
   receiving the student response data contained in the scores database;
   analyzing said student response data;
   preparing a report based upon said student response data; and
   transmitting said report to an authorized recipient to guide the student's education.

3. A method of teaching according to claim 1 wherein a plurality of tutorial modules are provided, the game program being operable with any one of the tutorial modules, and wherein means are provided for enabling the selection of at least one of said tutorial modules.

4. A method of teaching according to claim 3 wherein the method may be simultaneously performed with at least two different tutorial modules.

5. A method of teaching according to claim 1 wherein a plurality of game programs are provided, each game program having an appropriate scoring algorithm and game flow pause points, each game program being operable with the tutorial module, and wherein means are provided for enabling the selection of a game program.

6. A method of teaching according to claim 1 wherein each question in the tutorial module includes a set of multiple choice answers, one of the answers being the best answer, and each question is displayed to the student with the multiple choice answers.

7. A method of teaching according to claim 6 further comprising the step of preventing the reselection of a question after the student has previously responded with the best answer for such question.

8. A method of teaching according to claim 6 further comprising the step of preventing the reselection of a question after the student has previously failed to select the best answer for such question and specified number of times.

9. A method of teaching according to claim 6 wherein the multiple choice answers are sequentially ranked from a worst answer to a best answer, with such ranking not being displayed.

10. A method of teaching according to claim 9 further comprising the step of recording in the scores database the sequential ranking of an answer selected by the student in response to a question.

11. A method of teaching according to claim 10 further comprising the step of recording in the scores database the sequential ranking of a plurality of answers selected by the student in response to repeated selection of the same question.

12. A method of teaching according to claim 6 wherein at least some of the educational information is incorporated into a plurality of hints pertaining to each question.

13. A method of teaching according to claim 12 wherein the hints form a series of hints progressing from a general hint to a specific hint for each question.

14. A method of teaching according to claim 13 further comprising the steps of:
preventing the reselection of a question after the student has previously responded with the best answer;
progressively displaying a more specific hint to the student upon each reselection of a question.

15. A method of teaching according to claim 1 further comprising the steps of:
selecting a second question from a tutorial module for a second student;
displaying the second question to the second student at a game flow pause point; and
recording second student response data, corresponding to the second student's responses to the questions, in the scores database.

16. A method of teaching according to claim 15 further comprising the step of generating a second game score for the second student and wherein the step of modifying the scoring algorithm makes scoring more likely by the student inputting the more correct input to his respective question.

17. A method of teaching according to claim 2 wherein the step of recording student response data comprises recording the student response data in a physical storage device, and the step of receiving the student response data comprises receiving the physical storage device and reading the physical storage device.

18. A method of teaching according to claim 17 wherein the physical storage device comprises a magnetic media storage device.

19. A method of teaching according to claim 18 wherein the magnetic media storage device comprises a magnetic diskette.

20. A method of teaching according to claim 2 wherein the step of receiving the student response data comprises receiving student response data from a plurality of students and wherein the steps of preparing a report and transmitting the report comprise preparing and transmitting a plurality of reports corresponding to each student.

21. A method of teaching according to claim 1 wherein the step of recording student response data in the scores database includes recording the student response data generated from a plurality of game sessions by the student.

22. A method of teaching according to claim 1 wherein the step of recording student response data in the scores database includes recording the student response data generated by a plurality of students.

23. A method of teaching according to claim 1 wherein all student response data and game input may be accepted through a joystick.

24. A method of teaching according to claim 1 wherein the questions in the tutorial module have an assigned difficulty level, means are provided for permitting the student to select a desired difficulty level and wherein selecting a question includes selecting a question of the desired difficulty level.

* * * * *